United States Patent [19]
Duerr et al.

[11] 3,810,993
[45] May 14, 1974

[54] CONTROL OF ACARINAE AND MOLLUSCS WITH PHENYLISOTHIOCYANATE COMPOUNDS

[75] Inventors: Dieter Duerr, Basel; Marcus Von Orelli, Muenchenstein, both of Switzerland

[73] Assignee: Ciba-Geigy AG, Basel, Switzerland

[22] Filed: Mar. 6, 1972

[21] Appl. No.: 232,209

Related U.S. Application Data

[63] Continuation of Ser. No. 877,460, Nov. 17, 1969, abandoned, which is a continuation-in-part of Ser. No. 646,184, June 15, 1967, abandoned.

[30] Foreign Application Priority Data
June 22, 1966  Switzerland.......................... 9058/66

[52] U.S. Cl. ................................................ 424/302
[51] Int. Cl............................................... A01n 9/18
[58] Field of Search ..................................... 424/302

[56] References Cited
UNITED STATES PATENTS

| | | | |
|---|---|---|---|
| 2,080,770 | 5/1937 | Goldschmidt et al............... | 424/302 |
| 2,263,386 | 11/1941 | Hester................................ | 424/302 |
| 2,865,803 | 12/1958 | Lewis.................................. | 424/302 |
| 3,265,561 | 9/1966 | Werres et al. ...................... | 424/302 |

*Primary Examiner*—Albert T. Meyers
*Assistant Examiner*—Daren M. Stephens
*Attorney, Agent, or Firm*—Frederick H. Rabin

[57] ABSTRACT

The present invention relates to a preparation and method for combating representatives of the order Acarina and molluscae which comprise as an active ingredient at least one compound of the formula

R — NCS in which R represents a lower alkyl, lower alkoxy or lower alkenyl radical or an optionally substituted aromatic monocyclic or polycyclic radical.

16 Claims, No Drawings

CONTROL OF ACARINAE AND MOLLUSCS WITH PHENYLISOTHIOCYANATE COMPOUNDS

CROSS REFERENCE

This is a continuation of application Ser. No. 877,460, filed on Nov. 17, 1969, which is a continuation-in-part of application Ser. No. 646,184, filed June 15, 1967, both now abandoned.

The present invention provides acaricidal and molluscicidal compositions which contain as an active ingredient a compound of general formula $$R - NCS \quad (I)$$

in which R represents a lower alkyl, lower alkoxy or lower alkenyl radical or an optionally substituted aromatic monocyclic or polycyclic radical optionally together with one or more diluents, solvents, dispersing agents, wetting agents, adhesives, fertilisers or carriers, as additives, as well as other biocidally active compounds which act against representatives of the order Acarina and/or molluscae especially gastropodes.

The invention also comprises a process for combating representatives of the order Acarina and molluscae with an isothiocyanate of the above formula or preparations containing said isothiocyanates.

The lower alkyl, alkoxyalkyl and alkenyl radicals enumerated as possible meanings of R contain 1 to 4 and 2 to 4 carbon atoms, respectively. Representatives of such radicals are e.g. methyl, ethyl, propyl, isopropyl, butyl, isobutyl, sec. or tert. butyl, allyl, propenyl and the various butenyl radicals. These radicals may in turn be substituted by one or more substituent selected from halogen atoms such as F, Cl, Br and I, nitrile, isonitrile, hydroxyl, mercapto, alkoxy or alkylthio groups, substituted amino groups, for example, acylamino groups or dialkylamino groups or also amino groups which form part of a heterocyclic ring, for example, pyrrolidino, piperidino morpholino, thiomorpholino, N-alkylpiperazino or homopiperazino groups.

When R is a mono- or polycyclic aromatic radical it may consist of a phenyl, naphthyl, phenanthryl, diphenyl, diphenyl-ether or diphenyl-sulphide group of which the phenyl radical is most preferred. The term aromatic group also includes heterocyclic groups with aromatic character for example, pyridine, thiophene or quinolyl groups. All these groups may be unsubstituted or substituted, for example, by one or more halogen atoms, alkyl, alkoxy, alkylthio, hydroxy, mercapto, acyloxy, acylamino, dialkylamino or acylthio groups and/or the following groups phenoxy, $CF_3$, $-NCS$, $-NO_2$, $-CN$, $-N\equiv C$, $-SCN$, $-COOH$, $-COOalkyl$,

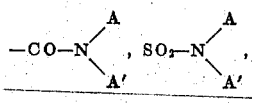

with the substitutents A or A' in the latter cases each representing a hydrogen atom or an alkyl group. The halogen atoms coming into consideration as substituents are fluorine, chlorine, bromine and iodine. Suitable alkyl substituents are of lower molecular weight and contain 1 to 4 carbon atoms. The same applies to the alkoxy, alkylthio, dialkylamino, alkyl CO—,

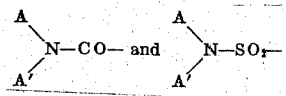

radicals. More details on such alkyl radicals have been given above. The phenoxy substituent in turn may bear the same substituents as are indicated for the aromatic radicals and is preferably linked to a phenyl radical.

Compounds which are especially suitable for the purpose of this invention correspond to the formula

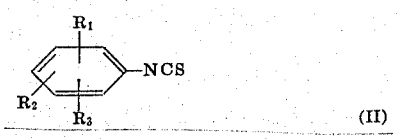

in which $R_1$ is selected from halogen especially chlorine and bromine, lower alkyl containing 1 to 4 carbon atoms especially methyl, lower alkoxy containing 1 to 4 carbon atoms especial methoxy and ethoxy, trifluoromethyl and nitro; $R_2$ is selected from hydrogen, halogen especially chlorine and bromine, lower alkyl containing 1 to 4 carbon atoms especially methyl; and $R_3$ is selected from hydrogen, lower alkyl containing 1 to 4 carbon atoms especially methyl and halogen, especially chlorine. Moreover $R_2$ and $R_3$ when in ortho position to one another may form together a lower alkenylene radical especially a —CH=CH—CH=CH— chain thus forming a napthalene radical with the phenyl radical with which they are connected.

It was, having regard to the biocidal properties of this known class of compounds, surprising to find that compounds of the formula I show a strong and long-lasting acaricidal and molluscicidal effect.

The acaricidal activity is especially effective with those representatives of the order Acarina which live on animals. Such individuals are above all ticks such as Rhipicephalus bursa, Boophilus microplus and Dermanyssus gallinae. The molluscicidal activity is especially effective with gastropodes such as water snails. Molluscs belong to the phylum Molluscae which are invertebrates and show specific characteristics which distinguish them clearly from vertebrates.

The compounds of the formulae I and II may be applied in a variety of forms. Thus they may be applied per se or worked up to compositions for example to powders, sprays, W.P. (wettable powders), to granules or pellets containing them in an effective amount. The effective amounts may vary within wide limits such as 0.01 to 90 percent by weight calculated on the weight of the composition. If the ultra low volume technique is applied even 100 percent of active ingredient may be used. The forms in which they are used largely depend on the use to which they are to be put.

Possible materials for the manufacture of directly sprayable solutions of the compounds of general formula I are, for example, mineral oil fractions of high to medium boiling range, for example, diesel oil or kerosene, coal tar oil and oils of vegetable or animal origin as well as hydrocarbons, for example, alkylated naphthalenes and tetrahydronaphthalene, optionally with the use of xylene mixtures, cyclohexanols, ketones and also chlorinated hydrocarbons, for example, trichlorethane and tetrachlorethane, trichlorethylene or trichlorobenzenes and tetrachlorobenzenes. Organic solvents whose boiling point is above 100°C. may advantageously be used.

Aqueous application forms are especially suitably prepared from emulsion concentrates, pastes or wettable spraying powders, by the addition of water. Possible emulsifying or dispersing agents are non-ionic products, for example, condensation products of aliphatic alcohols, amines or carboxylic acids having a long-chain hydrocarbon residue of about 10 to 20 carbon atoms and ethylene oxide, for example, the condensation product of octadecyl alcohol and 25 to 30 mols of ethylene oxide, or that of soya fatty acid and 30 mols of ethylene oxide or that of industrial oleylamine and 15 mols of ethylene oxide or that of dodecylmercaptan and 12 mols of ethylene oxide.

Amongst the anionic emulsifiers which may be employed there may be mentioned; the sodium salt of dodecyl alcohol sulphate, the sodium salt of dodecylbenzenesulphonic acid, the potassium or triethanolamine salt of oleic acid or of abietic acid or mixtures of these acids or the sodium salt of a petroleum sulphonic acid. Possible cationic dispersing agents are quaternary ammonium compounds, for example, cetyl pyridinium bromide, or dihydroxyethyl benzyl dodecyl ammonium chloride.

Solid carriers which may be employed for the manufacture of dusting and powdering agents are talc, kaolin, bentonite, calcium carbonate, calcium phosphate, but also charcoal, cork flour, wood flour and other materials of vegetable origin. It is also useful to manufacture the preparations in a granulated form. The various forms in which the preparations can be applied may be provided, in the usual manner, with additives which improve the distribution, adhesion, rain resistance or penetrating power. As such substances there may be mentioned fatty acids, resin, glue, casein or alginates.

The materials of the invention may be used by themselves or together with conventional pesticides, especially acaricides and/or molluscicides.

The active ingredients of the formula I may be manufactured by the process which are usual for the formation of isothiocyanates. A usual method, for example, comprises reacting an amine with thiophosgene in an organic solvent or in an aqueous/organic two phase system, with subsequent distillation of the resulting isothiocyanate. The relevant amines are commercially available at least described in the literature.

Many of the active substances can also be obtained by adding thiocyanic acid to a compound which contains one or more activated double bonds.

Example 1

3,5-Ditrifluoromethyl-phenyl-isothiocyanate

A solution of 456 g of 3,5-ditrifluoromethylaniline in 600 ml of methylene chloride is added over the course of 3 hours, at room temperature, to a mechanically stirred mixture of 600 ml of methylene chloride, 1.2 l of water and 245 g of thiophosgene. When addition is complete the mixture is stirred for approximately a further 5 hours and the organic layer is separated off and washed with water until neutral. The solution, dried over sodium sulphate, is evaporated and the residue distilled in vacuo. Yield 501.5 g. Boiling point 94–95°C/19 mm (Compound No. 1)

The isothiocyanates tabulated below can be manufactured by an anologous method. Further methods for the manufacture of isothiocyanates are to be found in Houben-Weyl, volume IX, pages 867–884.

| Compound No. | R | Boiling Point °C/mm Hg | Melting Point |
|---|---|---|---|
| 2 | Phenyl- | 93–94°/11 | |
| 3 | 3-Methylphenyl | 111°/13 | |
| 4 | 2-Methylphenyl | 105–107°/10 | |
| 5 | 4-Methylphenyl | 114°/15 | |
| 6 | 2-Chlorophenyl- | 121°/14 | |
| 7 | 3-Chlorophenyl- | 118–20°/13 | |
| 8 | 4-Chlorophenyl- | 119°/10 | |
| 9 | 2-Methoxyphenyl- | 129°/11 | |
| 10 | 3-Methoxyphenyl- | 128–129°/10 | |
| 11 | 4-Methoxyphenyl- | 129°/8 | |
| 12 | 2,4-Dichlorophenyl- | 147°/14 | |
| 13 | 3,4-Dichlorophenyl- | 148°/12 | |
| 14 | 2,5-Dichlorophenyl- | 140/12 | |
| 15 | 4-Methoxy-3-chloro-phenyl | 170°/13 | |
| 16 | 4-Butoxy-phenyl- | 177°/14 | |
| 17 | 4-Butyl-phenyl- | 165°/17 | |
| 18 | 3-Chloro-4-methyl-phenyl | 136°/14 | |
| 19 | 2,4,5-Trichlorophenyl | 172°/14 | |
| 20 | 2-Chloro-6-methylphenyl | 135°/10 | |
| 21 | 3-Chloro-2-methylphenyl | 134°/11 | |
| 22 | 4-Ethoxy-phenyl | 146°/19 | |
| 23 | 2-Ethoxy-phenyl | 133°/10 | |
| 24 | 4-Bromophenyl- | 140°/13 | |
| 25 | 4-Chloro-3-trifluormethyl-phenyl | 115°/12 | |
| 26 | 3,4-Dichloro-6-methyl-phenyl | 98°/0.05 | |
| 27 | 2-Chloro-5-trifluoromethyl-phenyl | 114°/10 | |
| 28 | 5-Chloro-2-methyl-phenyl- | 123°/8 | |
| 29 | 4-(p-Chlorophenoxy)-phenyl- | 153°/0.2 | |
| 30 | 4-Phenoxyphenyl | 143°/0.2 | |
| 31 | 4-Chloro-2-methyl-phenyl- | 136°/13 | |
| 32 | 3,4-Dimethylphenyl- | 124–27°/9 | |
| 33 | 2,5-Dimethylphenyl | 126°/10 | |
| 34 | 4-Dimethylaminophenyl- | | 69–71° |
| 35 | α-Naphthyl | 100°/0.2 | |
| 36 | 4-Nitrophenyl- | | 111–113° |
| 37 | 3-Nitrophenyl- | | 61–63° |
| 38 | 4-Methoxy-2-nitro-phenyl- | | 95–96° |

TABLE—Continued

| Compound No. | R | Boiling Point °C/mm Hg | Melting Point |
|---|---|---|---|
| 39 | 4-Methyl-2-nitro-phenyl- | | 66–67° |
| 40 | 3-Sulphonamido-phenyl- | | 146–149° |
| 41 | 3-Trifluoromethylphenyl | 87–89°/11 | |
| 42 | 2-Chloro-4-nitro-phenyl- | | 82–83° |
| 43 | Methyl- | 118–120° | |
| 44 | Methoxymethyl | 35–36°/11 | |
| 45 | Ethyl- | 130–132° | |
| 46 | Allyl- | 150–151° | |
| 47 | 2,6-Dichlorophenyl- | | 42–43° |
| 48 | 2-Ethyl-4-chlorophenyl | 148°/20 | |
| 49 | 3-Methyl-4-chlorophenyl- | 133°/10 | |
| 50 | 2-Ethylphenyl- | 116°/15 | |
| 51 | 2,3-Dimethylphenyl- | 134°/16 | |
| 52 | 2-Methyl-4-bromophenyl- | 50–51° | |
| 53 | 2,5-Dimethyl-4-chlorophenyl- | 151°/16 | |
| 54 | 4-Ethylphenyl- | 126°/16 | |

As further isothiocyanates there may be mentioned, butyl isothiocyanate, propyl isothiocyanate, 1- and 2-methylnaphthyl isothiocyanate, m- or p-hydroxyphenyl isothiocyanate, 2-, 3- and 4-carboxyphenyl isothiocyanate and the like.

Example 2

In order to test the effect on gastropodes (Australorbis glabratus) 1 g of active substance at a time and 1 g of emulsifier (an alkylarylsulphonate) were dissolved in acetone and made up to 10 ccs with acetone. The desired concentrations were prepared from this by means of water. Suitable diluted aqueous preparations contain about 0.01 to 10 ppm of active ingredient.

Example 3

Test of the Effect on Gastropodes 5 snails (Australorbis glabratus) per concentration were exposed to the test solutions for 24 hours and thereafter transferred to clean water. The effect (LC 100) is determined 48 hours after exposure. The experiments were twice repeated at 21–23°C.

Test for the Effect on Ticks: (Rhipicephalus bursa)

10 ticks per concentration were briefly immersed in the test solution. The effect (LC 100) is determined 2 weeks after exposure (2 repeats at 21–23°C).

LC 100 is the lethal concentration in ppm which effects a 100 percent destruction of the test individuals.

The following values were obtained (LC 100 in ppm):

| Compound | R | R. bursa | B. microplus | D. gallinae | Snails |
|---|---|---|---|---|---|
| 48 | Cl–⌬–C₂H₅ | 10 | | | 1 |
| 5 | CH₃–⌬ | 10 | 10 | 10 | 3 |
| 12 | Cl–⌬–Cl | 100 | 1 | 10 | 3 |
| 14 | 2,6-Cl₂-⌬ | 100 | 1 | 10 | 3 |
| 13 | Cl–⌬–Cl | 100 | 1 | 100 | 0.75 |
| 25 | Cl–⌬–CF₃ | 100 | 10 | 1–10 | 1.5 |
| 26 | CH₃–⌬–Cl | 100 | 10 | 10 | 5 |
| 31 | Cl–⌬–CH₃ | 100 | 10 | 10 | 1 |
| 15 | CH₃O–⌬–Cl | 100 | 10 | 10 | |
| 8 | Cl–⌬ | 100 | 10 | 10 | 0.75 |
| 32 | CH₃–⌬–CH₃ | 100 | 10 | 10 | |
| 43 | CH₃– | 100 | 10 | 10 | |
| 9 | OCH₃–⌬ | 100 | 10 | 10 | 3 |
| 22 | C₂H₅O–⌬ | 100 | 10 | 10–100 | 1.5 |
| 24 | Br–⌬ | 100 | 10 | 10–100 | 1.5 |
| 54 | H₅C₂–⌬ | 100 | 10 | 10–100 | 3 |
| 27 | Cl–⌬–CF₃ | 100 | 10 | 10–100 | |
| 49 | Cl–⌬–CH₃ | 100 | 10 | 10–100 | 3 |
| 50 | C₂H₅–⌬ | 100 | 10 | 10–100 | |
| 51 | ⌬–CH₃,CH₃ | 100 | 10 | 10–100 | |

TABLE—Continued

| | | R. bursa | B. microplus | D. gallinae | Snails |
|---|---|---|---|---|---|
| 23 | OC₂H₅-phenyl | 100 | 10 | 100 | 3 |
| 52 | Br-phenyl-CH₃ | 100 | 10 | 100 | 3 |
| 17 | C₄H₉-phenyl | 100 | 10 | 100 | 3 |
| 21 | Cl,CH₃-phenyl | 100 | 10 | 100 | 1.5 |
| 33 | CH₃,CH₃-phenyl | 100 | 10 | 100 | 3 |
| 22 | CH₃O-phenyl | 100 | 10 | 100 | 1.5 |
| 35 | naphthyl | 100 | 10 | 100 | 1.5 |
| 36 | O₂N-phenyl | 100 | 10 | 100 | 3 |
| 19 | Cl,Cl,Cl-phenyl | 100 | 10 | 100 | 3 |
| 53 | Cl,CH₃,CH₃-phenyl | 100 | 10 | 100 | — |

We claim:

1. A method for controlling members of the order acarina which comprises contacting them with an acaricidally effective amount of 2-methyl-4-chlorophenylisothiocyanate.

2. A method according to claim 1 in which the members of the order acarina are ticks.

3. A method for controlling members of the order acarina which comprises contacting them with an acaricidally effective amount of 2-ethyl-4-chlorophenylisothiocyanate.

4. A method according to claim 3 in which the members of the order acarina are ticks.

5. A method for controlling members of the order acarina which comprises contacting them with an acaricidally effective amount of 4-methoxyphenylisothiocyanate.

6. A method according to claim 5 in which the members of the order acarina are ticks.

7. A method for controlling members of the order acarina which comprises contacting them with an acaricidally effective amount of 4-methylphenylisothiocyanate.

8. A method according to claim 7 in which the members of the order acarina are ticks.

9. A method for controlling members of the order acarina which comprises contacting them with an acaricidally effective amount of 4-ethylphenylisothiocyanate.

10. A method according to claim 9 in which the members of the order acarina are ticks.

11. A method for controlling members of the order acarina which comprises contacting them with an acarididally effective amount of 2-ethyl-4-bromophenylisothiocyanate.

12. A method according to claim 11 in which the members of the order acarina are ticks.

13. A method for controlling members of the order acarina which comprises contacting them with an acaricidally effective amount of 3-chloro-4-methoxyphenylisothiocyanate.

14. A method according to claim 13 in which the members of the order acarina are ticks.

15. A method for controlling members of the order acarina which comprises contacting them with an acaricidally effective amount of 2-methyl-4,5-dichlorophenylisothiocyanate.

16. A method according to claim 15 in which the members of the order acarina are ticks.

* * * * *